United States Patent
Baek et al.

(10) Patent No.: US 12,444,733 B2
(45) Date of Patent: Oct. 14, 2025

(54) NEGATIVE ELECTRODE AND SECONDARY BATTERY INCLUDING THE NEGATIVE ELECTRODE

(71) Applicant: LG ENERGY SOLUTION, LTD., Seoul (KR)

(72) Inventors: Joo Yul Baek, Daejeon (KR); Hee Won Choi, Daejeon (KR); Yeon Ji Oh, Daejeon (KR); Chan Ki Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 695 days.

(21) Appl. No.: 17/606,282

(22) PCT Filed: May 29, 2020

(86) PCT No.: PCT/KR2020/007029
§ 371 (c)(1),
(2) Date: Oct. 25, 2021

(87) PCT Pub. No.: WO2020/242257
PCT Pub. Date: Dec. 3, 2020

(65) Prior Publication Data
US 2022/0216461 A1    Jul. 7, 2022

(30) Foreign Application Priority Data

May 29, 2019    (KR) .................. 10-2019-0063108

(51) Int. Cl.
| | |
|---|---|
| H01M 4/36 | (2006.01) |
| H01M 4/58 | (2010.01) |
| H01M 4/587 | (2010.01) |
| H01M 4/62 | (2006.01) |
| H01M 10/0525 | (2010.01) |
| H01M 4/02 | (2006.01) |

(52) U.S. Cl.
CPC .......... *H01M 4/364* (2013.01); *H01M 4/587* (2013.01); *H01M 4/625* (2013.01); *H01M 10/0525* (2013.01); *H01M 2004/021* (2013.01); *H01M 2004/027* (2013.01)

(58) Field of Classification Search
CPC ...... H01M 4/364; H01M 4/587; H01M 4/625; H01M 10/0525
See application file for complete search history.

(56) References Cited

U.S. PATENT DOCUMENTS

| | | | |
|---|---|---|---|
| 2001/0033822 A1* | 10/2001 | Ishii ...................... | C01B 32/205 423/448 |
| 2002/0076614 A1 | 6/2002 | Yoon et al. | |
| 2004/0248010 A1 | 12/2004 | Kato et al. | |
| 2007/0178382 A1 | 8/2007 | Kim et al. | |
| 2010/0136431 A1* | 6/2010 | Lee ...................... | H01M 4/13 977/750 |
| 2012/0258357 A1 | 10/2012 | Kim | |
| 2014/0212750 A1 | 7/2014 | Ahn et al. | |
| 2014/0227588 A1 | 8/2014 | Kim et al. | |
| 2014/0302373 A1* | 10/2014 | Lockett ................. | H01M 6/164 427/122 |
| 2015/0079477 A1* | 3/2015 | Spahr ..................... | C01B 32/21 427/248.1 |
| 2016/0276657 A1 | 9/2016 | Song et al. | |
| 2017/0110729 A1* | 4/2017 | Tsuchiya ............... | H01M 4/587 |
| 2018/0175439 A1 | 6/2018 | Kang et al. | |
| 2018/0219216 A1 | 8/2018 | Choi et al. | |
| 2019/0123356 A1 | 4/2019 | Ko et al. | |

FOREIGN PATENT DOCUMENTS

| | | |
|---|---|---|
| CN | 1574444 A | 2/2005 |
| CN | 103843179 A | 6/2014 |
| CN | 104108160 A | 10/2014 |
| CN | 107851780 A | 3/2018 |
| JP | 2005-4974 A | 1/2005 |
| JP | 2013-211254 A | 10/2013 |
| KR | 10-1999-0080594 A | 11/1999 |
| KR | 10-2007-0078536 A | 8/2007 |
| KR | 10-2010-0119311 A | 11/2010 |
| KR | 10-2013-0015967 A | 2/2013 |
| KR | 10-1233325 B1 | 2/2013 |
| KR | 10-2014-0099987 A | 8/2014 |

(Continued)

OTHER PUBLICATIONS

"A superior low-cost amorphous carbon anode made from pitch and lignin for sodium-ion batteries", Li et al., J. Mater Chem A, Apr. 2016, 96-104.*
International Search Report for PCT/KR2020/007029 mailed on Sep. 10, 2020.
Extended European Search Report: tion No. 20812517.9, dated Jun. 3, 2022.

*Primary Examiner* — Kenneth J Douyette
(74) *Attorney, Agent, or Firm* — Birch, Stewart, Kolasch & Birch, LLP

(57) ABSTRACT

Disclosed is a negative electrode including a negative electrode active material layer, wherein the negative electrode active material layer includes a negative electrode active material and a conductive agent. The negative electrode active material includes carbon-based active material particles including natural graphite and an amorphous carbon-based material. The carbon-based active material particles have a specific surface area of 1.4 $m^2/g$ to 2.3 $m^2/g$, and the conductive agent includes carbon nanotubes having an average length of 1 μm to 12 μm. A secondary battery including the negative electrode is also disclosed.

9 Claims, No Drawings

(56) References Cited

FOREIGN PATENT DOCUMENTS

| | | |
|---|---|---|
| KR | 10-2014-0139355 A | 12/2014 |
| KR | 10-2015-0048499 A | 5/2015 |
| KR | 10-2016-0014539 A | 2/2016 |
| KR | 10-2017-0031061 A | 3/2017 |
| KR | 10-2017-0117980 A | 10/2017 |
| KR | 10-1921541 B1 | 11/2018 |
| KR | 10-2019-0043955 A | 4/2019 |
| KR | 10-2015-0032014 A | 6/2025 |

* cited by examiner

NEGATIVE ELECTRODE AND SECONDARY BATTERY INCLUDING THE NEGATIVE ELECTRODE

CROSS-REFERENCE TO RELATED APPLICATIONS

This application claims priority from Korean Patent Application No. 10-2019-0063108, filed on May 29, 2019, the disclosure of which is incorporated by reference herein.

TECHNICAL FIELD

The present invention relates to a negative electrode including a negative electrode active material layer, wherein the negative electrode active material layer includes a negative electrode active material and a conductive agent, wherein the negative electrode active material includes carbon-based active material particles including natural graphite and an amorphous carbon-based material, the carbon-based active material particles have a specific surface area of 1.4 $m^2/g$ to 2.3 $m^2/g$, and the conductive agent includes carbon nanotubes having an average length of 1 μm to 12 μm. The present invention also relates to a secondary battery including the negative electrode.

BACKGROUND ART

Requirements for the use of alternative energy or clean energy have increased due to the rapid increase in the use of fossil fuels, and, as a part of this trend, power generation and electricity storage using an electrochemical reaction are the most actively researched areas.

Currently, a typical example of an electrochemical device using the electrochemical energy may be a secondary battery and there is a trend that its usage area is expanding more and more. In recent years, demand for secondary batteries as an energy source has been significantly increased as technology development and demand with respect to portable devices, such as portable computers, mobile phones, and cameras, have increased. In general, a secondary battery is composed of a positive electrode, a negative electrode, an electrolyte, and a separator. The negative electrode includes a negative electrode active material in which lithium ions released from the positive electrode are intercalated and deintercalated, and a graphite-based active material, for example, natural graphite or artificial graphite may be used as the negative electrode active material.

Artificial graphite is advantageous for battery life characteristics and high-temperature storage characteristics, but has a problem of low electrode adhesion and high price.

Natural graphite is advantageous in that it has high electrode adhesion and may increase capacity of the battery. However, since the natural graphite has a plurality of internal voids, a side reaction between an electrolyte solution and the natural graphite occur excessively, and thus, gas is excessively generated in the battery. Also, a volume of the natural graphite increases excessively during charge and discharge of the battery. As a result, because of the above reasons, the high-temperature storage characteristics and life characteristics of the battery are degraded.

In order to address these limitations, a technique of disposing an amorphous carbon coating layer on conventional natural graphite has typically been used. The amorphous carbon coating layer is prepared from pitch or the like. However, in this case, it is difficult to maintain high charge/discharge capacity, and there is a limitation in that a degree of improvement in the life characteristics and high-temperature storage characteristics of the battery is not large.

Thus, there is a need for a negative electrode capable of improving the life characteristics and high-temperature storage characteristics of the battery while obtaining an advantage of improving electrode adhesion and capacity by using natural graphite.

DISCLOSURE OF THE INVENTION

Technical Problem

An aspect of the present invention provides a negative electrode, which has high electrode adhesion and capacity and may improve life characteristics and high-temperature storage characteristics of a battery by using natural graphite, and a secondary battery including the same.

Technical Solution

According to an aspect of the present invention, there is provided a negative electrode including a negative electrode active material layer, wherein the negative electrode active material layer includes a negative electrode active material and a conductive agent, wherein the negative electrode active material includes carbon-based active material particles including natural graphite and an amorphous carbon-based material, the carbon-based active material particles have a specific surface area of 1.4 $m^2/g$ to 2.3 $m^2/g$, and the conductive agent includes carbon nanotubes having an average length of 1 μm to 12 μm.

According to another aspect of the present invention, there is provided a secondary battery including the negative electrode.

Advantageous Effects

According to the present invention, since a negative electrode includes natural graphite and includes carbon-based active material particles having a low specific surface area as a negative electrode active material, an electrolyte solution side reaction may be reduced and a volume expansion of the negative electrode may be suppressed, and thus, life characteristics and high-temperature storage characteristics of a battery may be improved. Also, electrode adhesion may be improved due to characteristics of the natural graphite. Furthermore, since the negative electrode includes carbon nanotubes having a specific length as a conductive agent, an excellent conductive network between the carbon-based active material particles and the carbon nanotubes may be maintained even when a volume of the negative electrode is changed due to charge and discharge of the battery while improving the battery and manufacturing efficiency of the battery, and thus, the life characteristics and high-temperature storage characteristics of the battery and the electrode adhesion may be maximized.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular example embodiments only and is not intended to be limiting of the present invention. In the specification, the terms of a singular form may include plural forms unless referred to the contrary.

It will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

The expression "$D_{50}$" in the present specification may be defined as a particle diameter at a cumulative volume of 50% in a particle size distribution curve (graph curve of particle size distribution) of particles. The $D_{50}$, for example, may be measured by using a laser diffraction method. The laser diffraction method may generally measure a particle diameter ranging from a submicron level to a few mm and may obtain highly repeatable and high-resolution results.

<Negative Electrode>

A negative electrode according to an embodiment of the present invention includes a negative electrode active material layer, wherein the negative electrode active material layer includes a negative electrode active material and a conductive agent, wherein the negative electrode active material includes carbon-based active material particles including natural graphite and an amorphous carbon-based material, the carbon-based active material particles have a specific surface area of 1.4 $m^2$/g to 2.3 $m^2$/g, and the conductive agent may include carbon nanotubes having an average length of 1 μm to 12 μm.

The negative electrode may include a negative electrode active material layer.

The negative electrode active material layer may include a negative electrode active material and a conductive agent.

The negative electrode active material may include carbon-based active material particles.

The carbon-based active material particles may include natural graphite and an amorphous carbon-based material. Specifically, the carbon-based active material particles may include natural graphite and an amorphous carbon-based material disposed on the natural graphite.

The natural graphite may be formed through a spheroidization process of flaky natural graphite. Accordingly, the natural graphite may have a shape close to a spherical shape, unlike conventional flaky natural graphite. For this reason, since a volume expansion of the carbon-based active material particles may occur in all directions during charge and discharge of a battery and intercalation and deintercalation of lithium may be easy, life characteristics, high-temperature storage characteristics, and rapid charging performance of the battery may be improved.

The natural graphite may have an average particle diameter ($D_{50}$) of 5 μm to 30 μm, specifically, 6 μm to 28 μm. In a case in which the above range is satisfied, energy density of the negative electrode may be improved.

The amorphous carbon-based material may be disposed on the natural graphite. Specifically, the amorphous carbon-based material may be present as a kind of coating layer by being coated on the natural graphite.

The amorphous carbon-based material plays a role in providing appropriate adhesion so that natural graphite particles are combined with each other to form the carbon-based active material particles. The amorphous carbon-based material may be at least one carbide selected from the group consisting of tar, pitch, and other organic materials, or may be a carbon-based material formed by using a hydrocarbon as a source of chemical vapor deposition.

The carbide of the other organic materials may be a carbide of sucrose, glucose, galactose, fructose, lactose, mannose, ribose, aldohexose, or ketohexose, and a carbide of an organic material selected from a combination thereof.

The hydrocarbon may be a substituted or unsubstituted aliphatic or alicyclic hydrocarbon, or a substituted or unsubstituted aromatic hydrocarbon. The substituted or unsubstituted aliphatic or alicyclic hydrocarbon may include methane, ethane, ethylene, acetylene, propane, butane, butene, pentane, isobutane, or hexane. The substituted or unsubstituted aromatic hydrocarbon may include benzene, toluene, xylene, styrene, ethylbenzene, diphenylmethane, naphthalene, phenol, cresol, nitrobenzene, chlorobenzene, indene, coumarone, pyridine, anthracene, or phenanthrene.

The carbon-based active material particles may have an average particle diameter ($D_{50}$) of 5 μm to 30 μm, specifically 6 μm to 28 μm, and more specifically 8 μm to 22 μm. In a case in which the above range is satisfied, the energy density of the negative electrode may be improved, and the life characteristics of the battery may be further improved.

The carbon-based active material particles may have a specific surface area of 1.4 $m^2$/g to 2.3 $m^2$/g, specifically 1.5 $m^2$/g to 2.2 $m^2$/g, and more specifically 1.6 $m^2$/g to 2.0 $m^2$/g. In a case in which the specific surface area is less than 1.4 $m^2$/g, since the energy density of the negative electrode is excessively low, capacity of the battery may be significantly reduced. In contrast, in a case in which the specific surface area is greater than 2.3 $m^2$/g, since a side reaction between the carbon-based active material particles and an electrolyte solution excessively occurs, the life characteristics and the high-temperature storage characteristics of the battery may be degraded. The specific surface area may be measured by a Brunauer-Emmett-Teller (BET) measurement instrument.

The carbon-based active material particles may have a pore volume of 15 $cm^3$/g to 25 $cm^3$/g, specifically, 15 $cm^3$/g to $cm^3$/g. The pore volume is mainly affected by a total volume of pores present in and on surfaces of the carbon-based active material particles. Since the above range may be achieved because a technique of controlling the internal pores of the carbon-based active material particles by applying pressure to the carbon-based active material particles is accompanied, the pore volume of the carbon-based active material particles may be smaller than a pore volume of conventional carbon-based active material particles to which this technique is not applied. In a case in which the pore volume is satisfied, since a path through which lithium ions may move becomes shorter as the number of internal pores decreases, the rapid charging performance of the battery may be improved. Also, the life characteristics of the negative electrode may be improved by suppressing a volume expansion of the negative electrode. The pore volume may be measured by a BET measurement instrument.

The carbon-based active material particles may have a sphericity of 0.92 to 0.97, specifically 0.93 to 0.96, and more specifically 0.94 to 0.95. In a case in which the above range is satisfied, a high density negative electrode may be prepared, and there is an effect of improving negative electrode adhesion (force to prevent the negative electrode active material from being exfoliated from the negative electrode).

The carbon-based active material particles may be included in an amount of 85 wt % to 99 wt %, specifically, 90 wt % to 98 wt % in the negative electrode active material layer. In a case in which the above range is satisfied, desired capacity of the battery may be achieved.

Although not limited thereto, the carbon-based active material particles may be prepared by the following method. The method of preparing the carbon-based active material particles may include: preparing spherical natural graphite; controlling internal pores of the natural graphite; and disposing an amorphous carbon-based material on the natural graphite.

In the preparing of the spherical natural graphite, the natural graphite may be formed by modifying flaky natural graphite. The natural graphite may be prepared by spheroidizing the flaky natural graphite by a method of rolling or agglomerating the flaky natural graphite. Specifically, the flaky natural graphite may be modified into the spherical natural graphite using spheroidization equipment.

In the controlling of the internal pores of the natural graphite, as a method of controlling the internal pores, a method of filling the internal pores with pitch, or a cold isostatic pressing (CIP) method may be performed. The internal pores may have a low volume by this method. Also, the specific surface area of the carbon-based active material particles may be controlled by the controlling of the internal pores.

The disposing of the amorphous carbon-based material on the natural graphite may include performing a heat treatment after the natural graphite having the internal pores controlled is mixed with a material for forming the amorphous carbon-based material. However, it is not necessarily limited to this method.

The conductive agent may include carbon nanotubes. The carbon nanotubes play a role in reducing resistance of the negative electrode by forming a conductive network between the negative electrode active material particles.

In the carbon nanotube, a graphite sheet has a cylindrical shape with a nano-sized diameter and has an $sp^2$ bond structure. In this case, the carbon nanotube may exhibit characteristics of a conductor or semiconductor depending on a structure and an angle at which the graphite sheet is rolled. The carbon nanotube may be classified into a single-walled carbon nanotube (SWCNT) unit, a double-walled carbon nanotube (DWCNT) unit, and a multi-walled carbon nanotube (MWCNT) unit depending on the number of bonds forming the wall.

The carbon nanotubes may be single-walled carbon nanotubes. In a case in which the carbon nanotubes are single-walled carbon nanotubes, since single-walled carbon nanotubes have higher crystallinity than the double-walled or multi-walled carbon nanotubes, the conductive network in the negative electrode may be effectively formed.

The carbon nanotubes may have an average length of 1 μm to 12 μm, specifically 1 μm to 10 μm, and more specifically 3 μm to 8 μm. In a case in which the average length is less than 1 μm, since the carbon nanotubes do not sufficiently connect the negative electrode active material particles, the conductive network of the negative electrode is not effectively formed, and, accordingly, the life characteristics and the high-temperature storage characteristics of the battery may be degraded. In contrast, in a case in which the average length is greater than 12 μm, since the carbon nanotubes may not be smoothly dispersed in the negative electrode, the conductive network may not be uniformly formed and the life characteristics and high-temperature storage characteristics of the battery may be degraded. The average length may be confirmed by a method of obtaining an average of lengths of 100 carbon nanotubes in the negative electrode which are observed through a scanning electron microscope (SEM) or a transmission electron microscope (TEM).

In a case in which the conventional carbon-based active material particles are used, the average length of the carbon nanotubes must be 15 μm or more to suppress an excessive volume expansion. However, with respect to the present invention, since the carbon-based active material particles, in which the specific surface area is controlled to be small, are used, a volume expansion of the carbon-based active material particles themselves is not large, and thus, the average length of the carbon nanotubes may be reduced to a level of 1 μm to 12 μm. That is, the carbon nanotubes having an average length of 1 μm to 12 μm, which are used in the present invention, may be used because the carbon-based active material particles are used in combination.

The carbon nanotubes may have an average diameter of nm to 10 nm, specifically 3 nm to 8 nm, and more specifically 3.8 nm to 6 nm. In a case in which the average diameter is less than 1 nm, since the preparation of the carbon nanotubes is difficult, preparation costs are increased. In contrast, in a case in which the average diameter is greater than 10 nm, since an excessively large weight of the carbon nanotubes is used to form the conductive network, the battery and manufacturing efficiency of the battery are degraded. The average diameter may be confirmed by a method of obtaining an average of diameters of 100 carbon nanotubes in the negative electrode which are observed through an SEM or a TEM.

The carbon nanotubes may be included in an amount of 0.01 wt % to 1.0 wt % in the negative electrode active material layer, and may be specifically included in an amount of 0.01 wt % to 0.8 wt %. In a case in which the above range is satisfied, an excellent conductive network may be built in the negative electrode while high capacity of the battery is maintained.

A weight ratio of the carbon-based active material particles to the carbon nanotubes may be in a range of 1:0.00010 to 1:0.00105, specifically 1:0.00011 to 1:0.00102, and more specifically 1:0.00025 to 1:0.00060. In a case in which the above range is satisfied, since a conductive network may be smoothly formed around the carbon-based active material particles, the life characteristics and high-temperature storage characteristics of the battery may be improved.

The negative electrode active material layer may further include a binder. The binder may include at least one selected from the group consisting of a polyvinylidene fluoride-hexafluoropropylene copolymer (PVDF-co-HFP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, poly acrylic acid, and a material having hydrogen thereof substituted with lithium (Li), sodium (Na), or calcium (Ca), or may include various copolymers thereof.

The negative electrode active material layer may have a pore volume of 20 $cm^3$/g to 40 $cm^3$/g, specifically, 25 $cm^3$/g to 35 $cm^3$/g. In a case in which the above range is satisfied, the life characteristics and high-temperature storage characteristics of the battery may be improved. The above range is difficult to be derived by using only a conventional negative electrode active material. In other words, the above range means that the carbon nanotubes having an appropriate length and the carbon-based active material particles, in which the specific surface area is controlled to be small, may have a strong conductive network (which is not easily broken by contraction and expansion of the negative electrode) on the negative electrode. The pore volume may be measured by a plotting method using a Barrett-Joyner-Halenda (BJH) model after BET measurement.

The negative electrode may further include a current collector. The current collector plays a role in supporting the negative electrode active material layer. The negative electrode active material layer may be disposed on one surface or both surfaces of the current collector.

The current collector is not particularly limited so long as it has conductivity without causing adverse chemical changes in the battery. For example, copper, stainless steel, aluminum, nickel, titanium, baked carbon, aluminum or stainless steel that is surface-treated with one of carbon, nickel, titanium, silver, or the like may be used. Specifically, a transition metal that absorbs carbon well, such as copper and nickel, may be used as the current collector. The current collector may have a thickness of 6 μm to 20 μm, but the thickness of the current collector is not limited thereto.

<Secondary Battery>

A secondary battery according to another embodiment of the present invention may include a negative electrode, and the negative electrode is the same as the above-described negative electrode according to the embodiment.

Specifically, the secondary battery may include the negative electrode, a positive electrode, a separator disposed between the negative electrode and the positive electrode, and an electrolyte, wherein the negative electrode is the same as the above-described negative electrode. Since the negative electrode has been described above, detailed descriptions thereof will be omitted.

The positive electrode may include a positive electrode collector and a positive electrode active material layer which is formed on the positive electrode collector and includes a positive electrode active material.

In the positive electrode, the positive electrode collector is not particularly limited as long as it has conductivity without causing adverse chemical changes in the batteries, and, for example, stainless steel, aluminum, nickel, titanium, baked carbon, or aluminum or stainless steel that is surface-treated with one of carbon, nickel, titanium, silver or the like may be used. Also, the positive electrode collector may typically have a thickness of 3 μm to 500 μm and may have a surface with fine roughness to improve adhesion to the positive electrode active material. The positive electrode collector may be used in various shapes, for example, a film, a sheet, a foil, a net, a porous body, a foam body, a non-woven fabric body, and the like.

The positive electrode active material may be a typically used positive electrode active material. Specifically, the positive electrode active material may include a layered compound, such as lithium cobalt oxide ($LiCoO_2$) or lithium nickel oxide ($LiNiO_2$), or a compound substituted with one or more transition metals; lithium iron oxides such as $LiFe_3O_4$; lithium manganese oxides such as $Li_{1+c1}Mn_{2-c1}O_4$ ($0 \le c1 \le 0.33$), $LiMnO_3$, $LiMn_2O_3$, and $LiMnO_2$; lithium copper oxide ($Li_2CuO_2$); vanadium oxides such as $LiV_3O_8$, $V_2O_5$, and $Cu_2V_2O_7$; nickel (Ni)-site type lithium nickel oxide expressed by a chemical formula of $LiNi_{1-c2}M_{c2}O_2$ (where M is at least one selected from the group consisting of cobalt (Co), manganese (Mn), aluminum (Al), copper (Cu), iron (Fe), magnesium (Mg), boron (B), and gallium (Ga), and c2 satisfies $0.01 \le c2 \le 0.3$); lithium manganese composite oxide expressed by a chemical formula of $LiMn_{2-c3}M_{c3}O_2$ (where M is at least one selected from the group consisting of Co, Ni, Fe, chromium (Cr), zinc (Zn), and tantalum (Ta), and c3 satisfies $0.01 \le c3 \le 0.1$) or $Li_2Mn_3MO_8$ (where M is at least one selected from the group consisting of Fe, Co, Ni, Cu, and Zn); and $LiMn_2O_4$ having a part of Li being substituted with alkaline earth metal ions, but the positive electrode active material is not limited thereto. The positive electrode may be Li-metal.

The positive electrode active material layer may include a positive electrode conductive agent and a positive electrode binder as well as the above-described positive electrode active material.

In this case, the positive electrode conductive agent is used for providing conductivity to the electrode, wherein any conductive agent may be used without particular limitation as long as it has electronic conductivity without causing adverse chemical changes in the battery. Specific examples of the positive electrode conductive agent may be graphite such as natural graphite and artificial graphite; a carbon-based material such as carbon black, acetylene black, Ketjen black, channel black, furnace black, lamp black, thermal black, and carbon fibers; metal powder, such as copper powder, nickel powder, aluminum powder, and silver powder, or metal fibers; conductive whiskers such as zinc oxide whiskers and potassium titanate whiskers; conductive metal oxide such as titanium oxide; or conductive polymers such as polyphenylene derivatives, and one alone or a mixture of two or more thereof may be used.

Also, the positive electrode binder functions to improve binding between positive electrode active material particles and adhesion between the positive electrode active material and the positive electrode collector. Specific examples of the positive electrode binder may be polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluoro rubber, or various copolymers thereof, and one alone or a mixture of two or more thereof may be used.

The separator separates the negative electrode and the positive electrode and provides a movement path of lithium ions, wherein any separator may be used as the separator without particular limitation as long as it is typically used in a secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer component may be used to secure heat resistance or mechanical strength, and the separator having a single layer or multilayer structure may be selectively used.

The electrolyte may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include a non-aqueous organic solvent and a metal salt.

Examples of the non-aqueous organic solvent may be aprotic organic solvents, such as N-methyl-2-pyrrolidone, propylene carbonate, ethylene carbonate, butylene carbonate, dimethyl carbonate, diethyl carbonate, γ-butyrolactone, 1,2-dimethoxy ethane, tetrahydroxy franc, 2-methyl tetrahydrofuran, dimethyl sulfoxide, 1,3-dioxolane, formamide, dimethylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate.

In particular, ethylene carbonate and propylene carbonate, ring-type carbonates among the carbonate-based organic solvents, well dissociate a lithium salt in the electrolyte solution due to high dielectric constants as high-viscosity organic solvents, and thus, the ring-type carbonate may be preferably used. Since an electrolyte solution having high electrical conductivity may be prepared when the ring-type carbonate is mixed with low-viscosity, low-dielectric constant linear carbonate, such as dimethyl carbonate and diethyl carbonate, in an appropriate ratio, the ring-type carbonate may be more preferably used.

A lithium salt may be used as the metal salt, and the lithium salt is a material that is readily soluble in the non-aqueous electrolyte solution, wherein, for example, any one selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used as an anion of the lithium salt.

At least one additive, for example, a haloalkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further included in the electrolyte in addition to the above-described electrolyte components for the purpose of improving life characteristics of the battery, preventing a decrease in battery capacity, and improving discharge capacity of the battery.

According to another embodiment of the present invention, a battery module including the secondary battery as a unit cell and a battery pack including the battery module are provided. Since the battery module and the battery pack include the secondary battery having high capacity, high rate capability, and high cycle characteristics, the battery module and the battery pack may be used as a power source of a medium and large sized device selected from the group consisting of an electric vehicle, a hybrid electric vehicle, a plug-in hybrid electric vehicle, and a power storage system.

Hereinafter, preferred examples will be provided for better understanding of the present invention. It will be apparent to those skilled in the art that these examples are only provided to illustrate the present invention and various modifications and alterations are possible within the scope and technical spirit of the present invention. Such modifications and alterations fall within the scope of claims included herein.

EXAMPLES AND COMPARATIVE EXAMPLES

Example 1: Preparation of Negative Electrode

Carbon-based active material particles, which included spheroidized (sphericity 0.95) natural graphite ($D_{50}$: 15 μm), which was obtained by modifying flaky natural graphite, and an amorphous carbon-based material disposed on the natural graphite, were used as a negative electrode active material. Also, a styrene butadiene rubber (SBR) was used as a binder, and carboxymethyl cellulose (CMC) was used as a thickener. A carbon nanotube dispersion, in which single-walled carbon nanotubes were dispersed in distilled water, was prepared.

The carbon-based active material particles, the binder, the thickener, and the carbon nanotube dispersion were added to distilled water and then mixed to prepare a negative electrode slurry (solid content 40 wt %). The negative electrode slurry was coated on a 10 μm thick copper foil (current collector) and then dried, and, in this case, a temperature of circulating air was 130° C. Subsequently, the current collector coated with the negative electrode slurry was roll-pressed, dried in a vacuum oven at 130° C. for 1 hour, and then punched into a rectangle having an area of 15.2 cm² to prepare a negative electrode including a negative electrode active material layer. A total amount of the carbon-based active material particles and the carbon nanotubes included in the negative electrode active material layer was 97.5 wt %.

The carbon-based active material particles had a specific surface area of 1.8 m²/g, the carbon-based active material particles had a pore volume of 20 cm³/g, the carbon-based active material particles had a $D_{50}$ of 15 μm, the carbon nanotubes had an average length of 5 μm, and a weight ratio of the carbon-based active material particles to the carbon nanotubes was 1:0.00050.

Example 2: Preparation of Negative Electrode

A negative electrode was prepared in the same manner as in Example 1 except that carbon-based active material particles having a specific surface area of 2.2 m²/g were used.

Example 3: Preparation of Negative Electrode

A negative electrode was prepared in the same manner as in Example 1 except that carbon-based active material particles having a pore volume of 25 cm³/g were used.

Example 4: Preparation of Negative Electrode

A negative electrode was prepared in the same manner as in Example 1 except that carbon-based active material particles having an average particle diameter ($D_{50}$) of 25 μm were used.

Example 5: Preparation of Negative Electrode

A negative electrode was prepared in the same manner as in Example 1 except that carbon nanotubes having an average length of 2 μm were used.

Example 6: Preparation of Negative Electrode

A negative electrode was prepared in the same manner as in Example 1 except that the weight ratio of the carbon-based active material particles to the carbon nanotubes was 1:0.00020.

Comparative Example 1: Preparation of Negative Electrode

A negative electrode was prepared in the same manner as in Example 1 except that the specific surface area of carbon-based active material particles was 1.0 m$^2$/g.

Comparative Example 2: Preparation of Negative Electrode

A negative electrode was prepared in the same manner as in Example 1 except that the specific surface area of carbon-based active material particles was 3.0 m$^2$/g.

Comparative Example 3: Preparation of Negative Electrode

A negative electrode was prepared in the same manner as in Example 1 except that the average length of carbon nanotubes in the negative electrode was 0.3 μm.

Comparative Example 4: Preparation of Negative Electrode

A negative electrode was prepared in the same manner as in Example 1 except that the average length of carbon nanotubes in the negative electrode was 20 μm.

TABLE 1

| | Specific surface area of carbon-based active material particles (m$^2$/g) | Pore volume of carbon-based active material particles (cm$^3$/g) | D$_{50}$ of carbon-based active material particles (μm) | Average length of carbon nanotubes (μm) | Weight ratio of carbon-based active material particles to carbon nanotubes |
|---|---|---|---|---|---|
| Example 1 | 1.8 | 20 | 15 | 5 | 1:0.00050 |
| Example 2 | 2.2 | 20 | 15 | 5 | 1:0.00050 |
| Example 3 | 1.8 | 25 | 15 | 5 | 1:0.00050 |
| Example 4 | 1.8 | 20 | 25 | 5 | 1:0.00050 |
| Example 5 | 1.8 | 20 | 15 | 2 | 1:0.00050 |
| Example 6 | 1.8 | 20 | 15 | 5 | 1:0.00020 |
| Comparative Example 1 | 1.0 | 20 | 15 | 5 | 1:0.00050 |
| Comparative Example 2 | 3.0 | 20 | 15 | 5 | 1:0.00050 |
| Comparative Example 3 | 1.8 | 20 | 15 | 0.3 | 1:0.00050 |
| Comparative Example 4 | 1.8 | 20 | 15 | 20 | 1:0.00050 |

The specific surface area of the carbon-based active material particles was confirmed by a BET sorption instrument (BEL). The average particle diameter (D$_{50}$) of the carbon-based active material particles was confirmed by using a PSD instrument. The pore volume of the carbon-based active material particles was measured by a plotting method using a BJH model after BET measurement.

The average length of the carbon nanotubes corresponds to an average length of 100 carbon nanotubes observed in an SEM image of the negative electrode.

Experimental Example 1: Electrode Adhesion Evaluation

Electrode adhesion was evaluated for each of the negative electrodes of Examples 1 to 6 and Comparative Examples 1 to 4 by the following method.

In order to evaluate adhesion between the copper current collector and the negative electrode active material layer, after each of the above-described negative electrodes prepared in the examples and the comparative examples was cut into a predetermined size and fixed to a slide glass, the adhesion was evaluated by measuring 90 degree peel strength by peeling off the current collector. In this case, a universal testing machine (UTM) was used for the measurement of the peel strength.

Experimental Example 2: Evaluation of Life Characteristics of Battery

Batteries were prepared as follows by using the negative electrodes of Examples 1 to 6 and Comparative Examples 1 to 4.

A LCO positive electrode active material, a carbon black-based conductive agent, and a PVDF powder binder were mixed in a weight ratio of 92:2:6 in an N-methyl-2-pyrrolidone solvent to prepare a positive electrode slurry. After the positive electrode slurry prepared was coated on a 20 μm thick positive electrode collector such that an electrode loading (mg/cm$^2$) was 23.4 mg per unit area and dried in a vacuum oven at 130° C. for 1 hour, the coated positive electrode collector was rolled between rolls heated to 80° C. at a pressure of 15 MPa to prepare a positive electrode having a final thickness (current collector+active material layer) of 72.5 μm.

The above-prepared negative electrode and positive electrode and a porous polyethylene separator were assembled by using a stacking method, and an electrolyte solution (ethylene carbonate (EC)/ethyl methyl carbonate (EMC) =1:4 (volume ratio), lithium hexafluorophosphate (LiPF$_6$ 1 mol), amount of vinylene carbonate (VC) based on weight of the electrolyte solution: 0.5 wt %) was injected into the assembled battery to prepare a lithium secondary battery.

After setting a charge range from a state of charge (SOC) of 0% to a SOC of 100% for the prepared batteries, each battery was charged and discharged in a first cycle at a current rate of 0.1 C, was charged and discharged in a second cycle at a current rate of 0.2 C, and was charged and discharged from a third cycle to a 100th cycle at 0.5 C, and capacity retention of each battery was then calculated by the following equation.

Capacity retention(%)=[(discharge capacity after the 100th cycle−initial discharge capacity)/initial discharge capacity]×100

Experimental Example 3: High-temperature Storage Characteristics Evaluation

A high-temperature storage resistance increase rate was evaluated for each of the negative electrodes of Examples 1 to 6 and Comparative Examples 1 to 4 by the following method.

The batteries prepared in the same manner as described in Experimental Example 2 were charged at a SOC of 100%, rested for 30 minutes, and discharged at 2 C. In this case, resistance of each battery was set as initial resistance. Thereafter, each battery was again charged at 0.5 C at a SOC of 100%, and, subsequently, the battery was stored in an oven at 60° C. After 4 weeks, the battery was taken out from the oven and rested for 4 hours so that the temperature was decreased to room temperature, and the battery was then discharged at 2 C. After resistance of the battery in this case was measured, a resistance increase rate of the battery was calculated by the following equation.

Resistance increase rate(%)=[(resistance after 4 weeks−initial resistance)/initial resistance]×100

TABLE 2

| | Electrode adhesion (gf/20 mm) | Capacity retention (%) | Resistance increase rate (%) |
|---|---|---|---|
| Example 1 | 41.8 | 95.9 | 12.2 |
| Example 2 | 36.5 | 94.2 | 18.0 |
| Example 3 | 38.2 | 94.8 | 16.7 |
| Example 4 | 32.8 | 92.3 | 13.1 |
| Example 5 | 35.4 | 93.0 | 19.1 |
| Example 6 | 34.2 | 90.8 | 18.9 |
| Comparative Example 1 | 42.3 | 84.8 | 21.2 |
| Comparative Example 2 | 18.5 | 75.8 | 28.4 |
| Comparative Example 3 | 20.2 | 70.6 | 26.4 |
| Comparative Example 4 | 31.5 | 81.8 | 25.1 |

Referring to Table 2, it may be understood that capacity retentions and resistance increase rates of the negative electrodes of the Examples, which included the carbon-based active material particles, in which the specific surface areas satisfied 1.4 m²/g to 2.3 m²/g, and the carbon nanotubes having an average length of 1 μm to 12 μm together, were significantly better than those of the Comparative Examples and electrode adhesions of the negative electrodes of the Examples were higher than electrode adhesions of Comparative Examples of 2, 3, and 4.

The invention claimed is:

1. A negative electrode, comprising:
a negative electrode active material layer,
wherein the negative electrode active material layer comprises a negative electrode active material and a conductive agent,
wherein the negative electrode active material comprises carbon-based active material particles comprising natural graphite and an amorphous carbon-based material,
wherein the carbon-based active material particles have a specific surface area of 1.4 m²/g to 2.3 m²/g,
wherein the conductive agent comprises carbon nanotubes having an average length of 1 μm to 12 μm, and
wherein the carbon nanotubes have an average diameter of 1 nm to 8 nm.

2. The negative electrode of claim 1, wherein the carbon-based active material particles have a specific surface area of 1.6 m²/g to 2.0 m²/g.

3. The negative electrode of claim 1, wherein the carbon-based active material particles have a pore volume of 15 cm³/g to 25 cm³/g.

4. The negative electrode of claim 1, wherein the carbon nanotubes are single-walled carbon nanotubes.

5. The negative electrode of claim 1, wherein a weight ratio of the carbon-based active material particles to the carbon nanotubes is in a range of 1:0.00010 to 1:0.00105.

6. The negative electrode of claim 1, wherein the carbon-based active material particles have a sphericity of 0.92 to 0.97.

7. The negative electrode of claim 1, wherein the negative electrode active material layer has a pore volume of 20 cm³/g to 40 cm³/g.

8. A secondary battery comprising:
the negative electrode of claim 1;
a positive electrode;
a separator disposed between the positive electrode and the negative electrode; and
an electrolyte.

9. The negative electrode of claim 1, wherein the negative electrode active material layer further comprises a binder, and
wherein the binder comprises at least one selected from the group consisting of a polyvinylidene fluoride-hexafluoropropylene copolymer (PVDF-co-HFP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, polyacrylic acid, and a material having a hydrogen thereof substituted with lithium (Li), sodium (Na), or calcium (Ca).

* * * * *